(12) United States Patent
Kikuchi

(10) Patent No.: US 6,345,032 B1
(45) Date of Patent: Feb. 5, 2002

(54) DISC TYPE DISCRIMINATING APPARATUS FOR USE WITH DISC CARTRIDGE AND DRIVE DEVICE

(75) Inventor: Shuichi Kikuchi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,314

(22) Filed: Oct. 15, 1998

(30) Foreign Application Priority Data

Oct. 17, 1997 (JP) ............................................. 9-285297
Oct. 17, 1997 (JP) ............................................. 9-285298

(51) Int. Cl.⁷ ............................ G11B 3/70; G11B 5/84; G11B 7/26; G11B 23/03
(52) U.S. Cl. ...................................... 369/272; 360/133
(58) Field of Search .................. 369/77.2, 52, 291, 369/77.1, 75.1, 75.2, 233, 272; 360/133, 99.01, 99.02, 99.03, 99.04, 99.05, 132

(56) References Cited

U.S. PATENT DOCUMENTS

| | | | | |
|---|---|---|---|---|
| 3,739,106 A | * | 6/1973 | Huijsers | 360/60 |
| 3,755,641 A | * | 8/1973 | Rackman | 200/52 R |
| 4,149,027 A | * | 4/1979 | Asher et al. | 463/44 |
| 4,860,128 A | * | 8/1989 | Nakagawa | 360/60 |
| 4,888,506 A | * | 12/1989 | Umehara et al. | 310/13 |
| 4,888,761 A | * | 12/1989 | Ohta | 369/291 |
| 5,016,123 A | * | 5/1991 | Karsh | 360/69 |
| 5,173,816 A | * | 12/1992 | Ogihara | 360/69 |
| 5,329,510 A | * | 7/1994 | Tsuyuguchi et al. | 369/47 |
| 5,434,722 A | * | 7/1995 | Bizjak et al. | 360/69 |
| 5,541,792 A | * | 7/1996 | Kinoshita et al. | 360/256.2 |
| 5,987,000 A | * | 11/1999 | Yamashita et al. | 369/192 |

FOREIGN PATENT DOCUMENTS

GB  764691  *  1/1957

* cited by examiner

Primary Examiner—David Davis
Assistant Examiner—Julie Anne Watko
(74) Attorney, Agent, or Firm—Frommer Lawrence & Haug LLP; William S. Frommer; Matthew K. Ryan

(57) ABSTRACT

A disc cartridge is played by a drive device. The disc cartridge includes a recording disc and a case for rotatably receiving therein the recording disc. The drive device includes a cartridge holder for receiving the disc cartridge, a spindle for rotating the recording disc installed in the disc cartridge, and a recording/reading head unit for recording information on the recording disc and/or reading the information on the recording disc. A disc type discriminating apparatus is incorporated with both the disc cartridge and the drive device for discriminating the type of the recording disc in the disc cartridge when the disc cartridge is put into the drive device. The apparatus comprises a sensed member fixed to the disc cartridge, the sensed member being capable of representing the type of the recording disc in the is disc cartridge; and a sensing device fixed to the drive device for sensing the sensed member to discriminate the type of the recording disc when the disc cartridge is put into the drive device. The sensed member is not a through hole, and the sensing device is not a device which uses light as detecting medium. The sensed member is spaced away from the sensing device at the time when the sensing device is sensing the sensed member.

8 Claims, 15 Drawing Sheets

DISC TYPE DISCRIMINATING APPARATUS FOR USE WITH DISC CARTRIDGE AND DRIVE DEVICE

BACKGROUND OF THE INVENTION

1. Field of the Invention

The present invention relates in general to disc type discriminating apparatuses for use with a system including a disc cartridge and a drive device by which a recording disc in the disc cartridge is driven, and more particularly to the disc type discriminating apparatuses of a type using a sensed means fixed to the disc cartridge and a sensing means fixed to the drive device, so that when the disc cartridge is slid into the drive device, the sensing means senses the sensed means to discriminate the type (which represents the storage capacity or the like) of the recording disc in the disc cartridge.

2. Description of the Prior Art

Hitherto, in the data processing field using a memory storage, various disc cartridges have been proposed and put into practical use as a recording medium. The disc cartridge comprises a recording disc and a case (or cartridge) in which the recording disc is rotatably installed. As the recording disc, a magnetic disc, optical disc, optical/magnetic disc and the like are used in accordance with the data storage capacity needed in the data processing field. When the disc cartridge is slid into a drive device, the recording disc in the case becomes set on a spindle of the drive device and a shutter part of the case is opened exposing a recording surface of the disc to a recording/reading head unit (viz., pick-up) of the drive device. When the drive device is switched ON, the disc is turned at a given high speed to record thereon information from the head unit or to give information therefrom to the head unit. Usually, a measure is employed for automatically switching the drive device ON when the disc cartridge is sled into the drive device.

As is known, the disc cartridges of each category are classified into some groups depending on the storage capacity, that is, the recording density on the disc. For example, in case of 3.5" microfloppy-disc cartridge, there are three groups, which are 1.44 MB-type, 1.2 MB-type and 720 KB-type.

For playing these different types of disc cartridges by a same drive device, there is need of inputting to a controller of the drive device an information on the type of the disc cartridge just before the disc cartridge is set to the proper position in the drive device. That is, upon receiving the information, the controller has to set the drive device to match to the type of the disc cartridge that is about to be set to the proper position.

One of known measures of producing such information is to provide the same portions of the disc cartridges with discrimination holes. For example, a first type of the disc cartridges is provided with a through hole, a second type of the disc cartridges is provided with a bottomed hole and a third type of the disc cartridges is provided with no hole. And, a detecting pin is provided to the drive device. When, upon insertion of a disc cartridge into the drive device, the detecting pin becomes engaged with a through hole, it is judged that the disc cartridge just set in the drive device is of the first type. That is, in case of the first type, the detecting pin is deeply inserted into the hole. In case of the second type, the detecting pin is shallowly inserted into the hole. While, in case of the third type, the detecting pin fails to detect the hole. That is, the moved distance of the detecting pin produces the information on the type of the disc cartridge. Usually, the information is electrically transmitted to the controller.

However, due to some reasons, the above-mentioned conventional measure has failed to provide users with satisfaction. That is, due to the compact construction of the disc cartridge, the area where the discrimination hole is provided is very limited, and the contacting engagement of the detecting pin with the discrimination hole is liable to cause abrasion of a periphery of the discrimination hole. Furthermore, the contacting engagement of the detecting pin with the discrimination hole tends to produce a noise.

SUMMARY OF THE INVENTION

It is therefore an object of the present invention to provide a measure which is free of the above-mentioned drawbacks.

According to the present invention, there is provided a disc type discriminating apparatus for use with a system including a disc cartridge and a drive device, which apparatus comprises a sensed means fixed to a disc cartridge and a sensing means fixed to a drive device, wherein when the disc cartridge is slid into the drive device, the sensing means senses the sensed means to discriminate the type of the disc in the disc cartridge without touching the same.

According to a first aspect of the present invention, there is provided a disc type discriminating apparatus used in a system including a disc cartridge and a drive device, the disc cartridge including a recording disc and a case for rotatably receiving therein the recording disc, the drive device driving the recording disc in the disc cartridge and including a cartridge holder for receiving the disc cartridge, a spindle for rotating the recording disc installed in the disc cartridge, and a recording/reading head unit for recording information on the recording disc and/or reading the information on the recording disc. The disc type discriminating apparatus discriminates the type of the recording disc in the disc cartridge when the disc cartridge is put into the drive device. The disc type discriminating device comprises a sensed means fixed to the disc cartridge, the sensed member being capable of representing the type of the recording disc in the disc cartridge, the sensed member being other than a through hole; and a sensing means fixed to the drive device for sensing the sensed means to discriminate the type of the recording disc when the disc cartridge is put into the drive device, the sensing means being other than means which uses light as a detecting medium, wherein the sensed means is spaced away from the sensing means at the time when the sensing means is sensing the sensed means.

According to a second aspect of the present invention, there is provided a disc type discriminating apparatus which comprises a disc cartridge including a recording disc; a case for rotatably receiving therein the recording disc, the case having therein an annular ridge by which a receiving portion for rotatably receiving the recording disc is defined and having thereabout a peripheral wall; and an identification metal piece fixed to the case at a position between the annular ridge and the peripheral wall, the identification metal piece being capable of representing the type of the recording disc; and a drive device for driving the recording disc in the disc cartridge, the drive device including: a cartridge holder for receiving the disc cartridge; a spindle for rotating the recording disc installed in the disc cartridge; a recording/reading head unit for recording information on the recording disc and/or reading the information on the recording disc; and a metal sensor for sensing the identification metal piece to discriminate the type of the recording disc in the disc cartridge when the disc cartridge is put into the drive device.

According to a third aspect of the present invention, there is provided a disc type discriminating apparatus which comprises a disc cartridge including a recording disc; a case for rotatably receiving therein the recording disc, the case having therein an annular ridge by which a receiving portion for rotatably receiving the recording disc is defined and having thereabout a peripheral wall; and an identification magnet piece fixed to the case at a position between the annular ridge and the peripheral wall, the identification magnet piece being capable of representing the type of the recording disc; and a drive device for driving the recording disc in the disc cartridge, the drive device including a cartridge holder for receiving the disc cartridge; a spindle for rotating the recording disc installed in the disc cartridge; a recording/reading head unit for recording information on the recording disc and/or reading the information on the recording disc; and a magnetic sensor for sensing the identification magnet piece to discriminate the type of the recording disc in the disc cartridge when the disc cartridge is put into the drive device.

According to a fourth aspect of the present invention, there is provided a disc cartridge which comprises a recording disc; a case in which the recording disc is rotatably held; and an identification metal piece fixed to the case, the identification metal piece being capable of representing the type of the recording disc.

According to a fifth aspect of the present invention, there is provided a disc cartridge which comprises a recording disc; a case in which the recording disc is rotatably held; and an identification magnet piece fixed to the case, the identification magnet piece being capable of representing the type of the recording disc.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
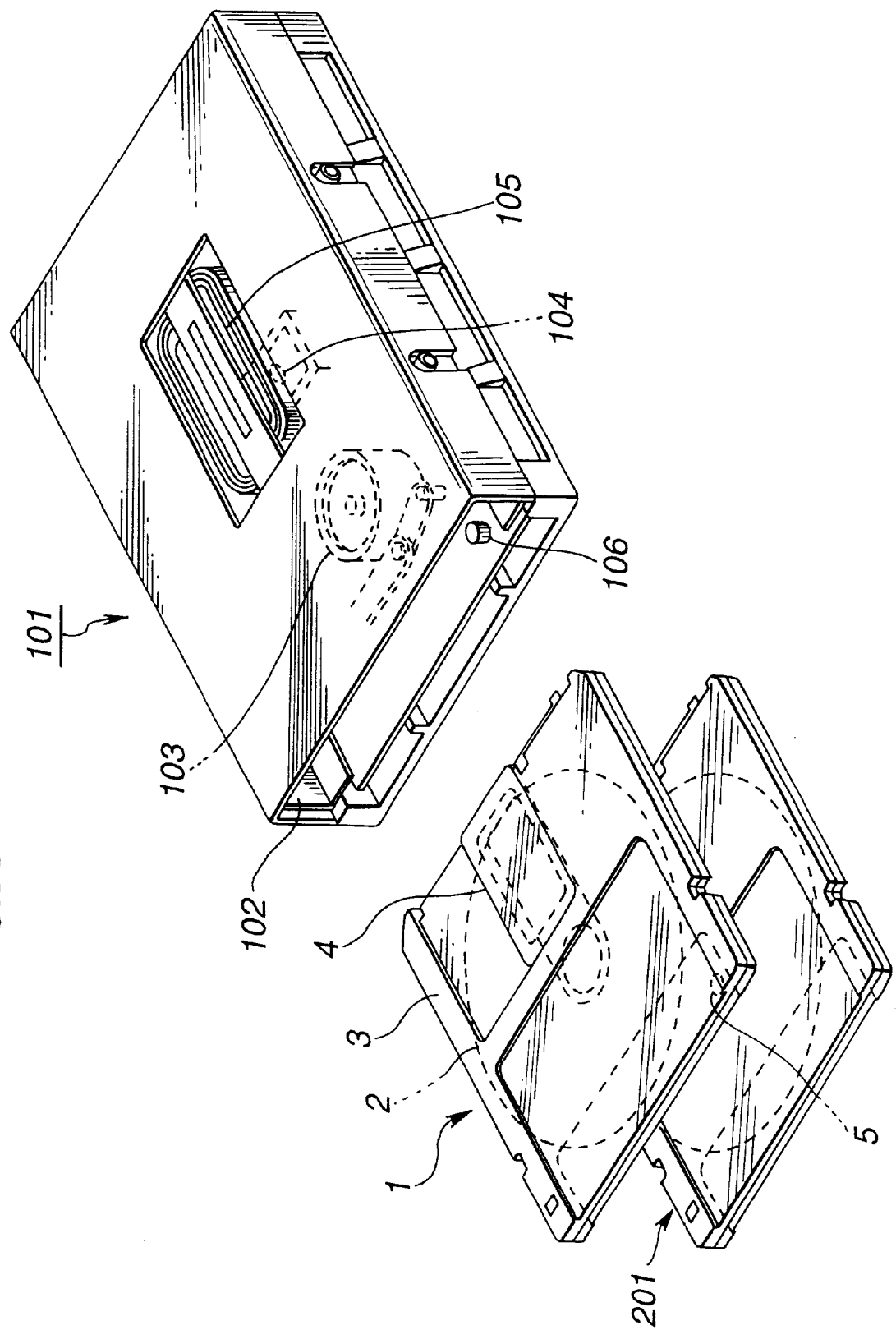
FIG. 1 is a perspective view showing a disc cartridge and a drive device, to which a first embodiment of the present invention is practically applied, and showing one conventional disc cartridge.

Referring to FIGS. 1 to 10, particularly FIG. 1, there is shown a first embodiment of the present invention.

In FIG. 1, there are shown a disc cartridge 1 and a drive device 101 to which the first embodiment is practically applied. In the drawing, a conventional disc cartridge 201 is also shown for reference.

The disc cartridge 1 comprises a recording disc 2 which serves as a recording medium and a rectangular case (or cartridge) 3 which rotatably receives therein the recording disc 2. In the illustrated embodiment, the recording disc 2 is an optical/magnetic disc. The disc cartridge 1 has at a front portion thereof a shutter 4 which is slidably mounted on the case 3. As is seen from FIG. 2, the disc cartridge 1 is equipped at its back side with an identification metal piece 5. In the illustrated embodiment, the identification metal piece 5 is positioned near one of two rear corners of the rectangular case 3. As will be described in detail hereinafter, the identification metal piece 5 is a member for representing the type (viz., storage capacity) of the disc cartridge 1 to which the metal piece 5 is attached.

Referring back to FIG. 1, the drive device 101 comprises a cartridge holder 102 which receives and holds therein the disc cartridge 1, a spindle 103 which rotates the recording disc 2 in the disc cartridge 1 set in the cartridge holder 102, a recording/reading head unit (viz., pick-up) 104 which, under rotation of the recording disc 2, records information on a recording surface of the recording disc 2 or reads the information recorded on the recording surface of the recording disc 2, a bias coil 105 which provides the recording surface of the recording disc 2 with an external magnetic field when the recording/reading head unit 104 records the information on the disc 2, and a metal sensor 106 which can sense the identification metal piece 5 when the disc cartridge 1 is properly set in the drive device 101.

Detailed construction of the disc cartridge 1 will be described with reference to FIG. 3 which shows an exploded view of the disc cartridge 1 turned upside down.

As is shown, the optical/magnetic disc 2 comprises a disc proper 21 and a metallic hub 22 which is fixed to a center of the disc proper 21. As will become apparent as the description proceeds, the metallic hub 22 is caught by a catching member of the drive device 101 when the disc cartridge 1 is properly set in the drive device 101.

The rectangular case 3 of the disc cartridge 1 comprises upper and lower rectangular halves 31 and 32 which are assembled to constitute a hollow rectangular structure.

The upper half 31 has at its inside center portion a smaller annular ridge 31a which rotatably receives therein the hub 22, and at its inside outer portion a larger annular ridge 31b which rotatably receives therein the disc proper 21. The smaller and larger annular ridges 31a and 31b are concentric with each other. The upper half 31 has further a rectangular cut 31c which extends radially outward from the smaller annular ridge 31a and terminates at a front edge of the upper half 31. In the illustrated embodiment, a bridge member (no numeral) extends across the front part of the rectangular cut 31c. The upper half 31 has on its outer surface (viz., the surface facing downward in FIG. 3) both a smaller rectangular recess 31d which constitutes a slide area for the shutter 4 and a larger rectangular recess 31e to which a rectangular label (not shown) is stuck.

Figure 3:
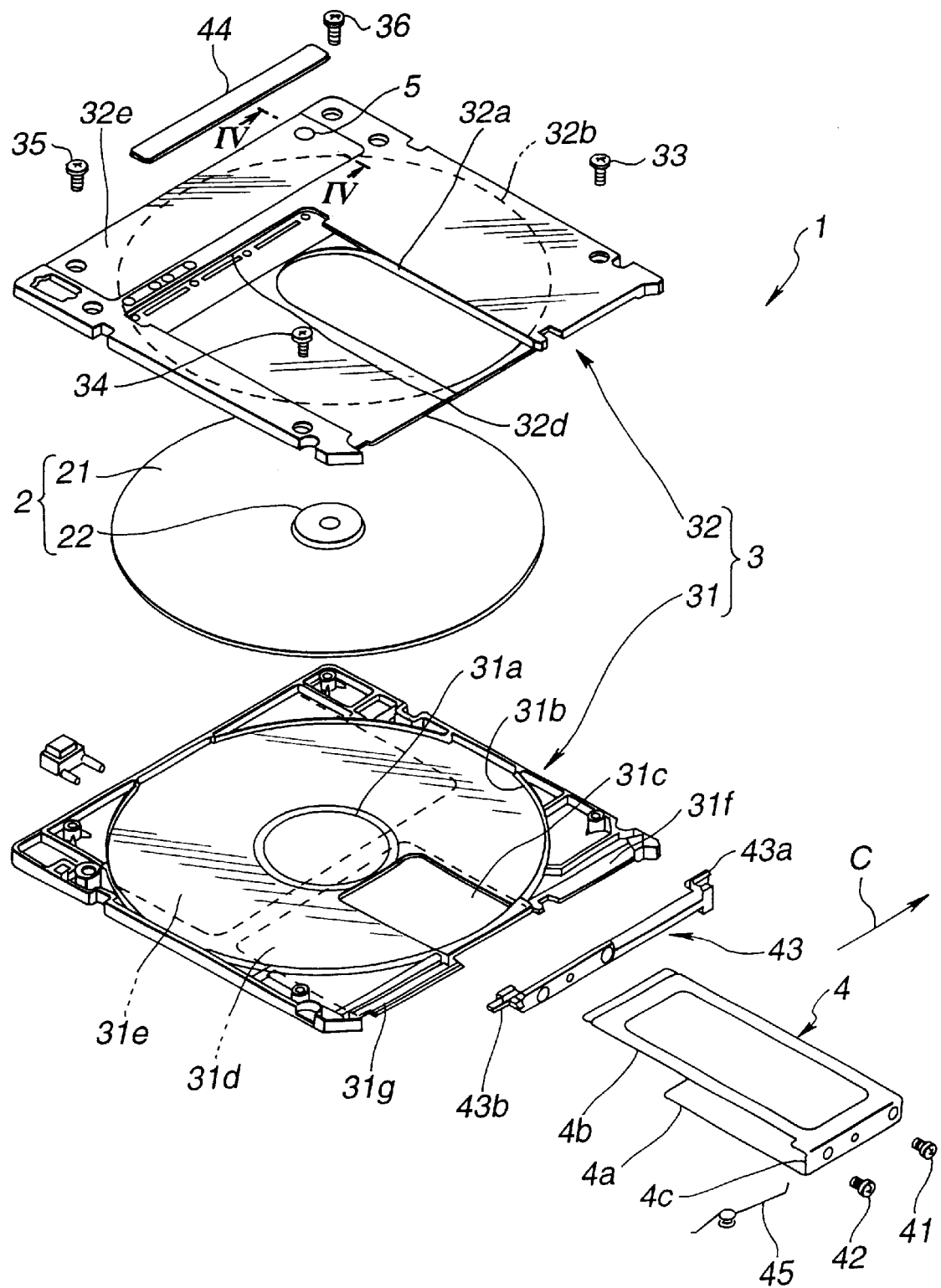
FIG. 3 is an exploded view of the disc cartridge of FIG. 1 to which the first embodiment is applied.

As is seen in FIG. 3, the lower half 32 has, at a portion facing to both the smaller annular ridge 31a and the rectangular cut 31c of the upper half 31, an elongate cut 32a which extends radially outward from a center of the lower half 32 and terminates at a front edge of the lower half 32. As shown, an inner end portion of the elongate cut 32a has a rounded periphery. The lower half 32 has at its inside outer portion a larger annular ridge 32b which, upon assembly of the upper and lower halves 31 and 32, abuts against the larger annular ridge 31b of the upper half 31 to constitute an enclosed circular space for the disc 2. The lower half 32 has on its outer surface (viz., the surface facing upward in FIG. 3) both a rectangular recess 32d which constitutes a slide area for the shutter 4 and an elongate recess 32e to which an elongate label (not shown) is stuck.

For assembling the disc cartridge 1, the two halves 31 and 32 are put on each other with the optical/magnetic disc 2 installed therebetween, and four connecting screws 33, 34, 35 and 36 are used for securing the two halves 31 and 32. For receiving the connecting screws 33, 34, 35 and 36, the two mated halves 31 and 32 have at their four corners four aligned bores, the bores of the upper half 31 being threaded for fastening the screws as shown. When the two halves 31 and 32 are assembled in the above-mentioned manner, slide guide grooves 31f and 31g are defined at a front edge of the assembled rectangular case 3.

Figure 2:
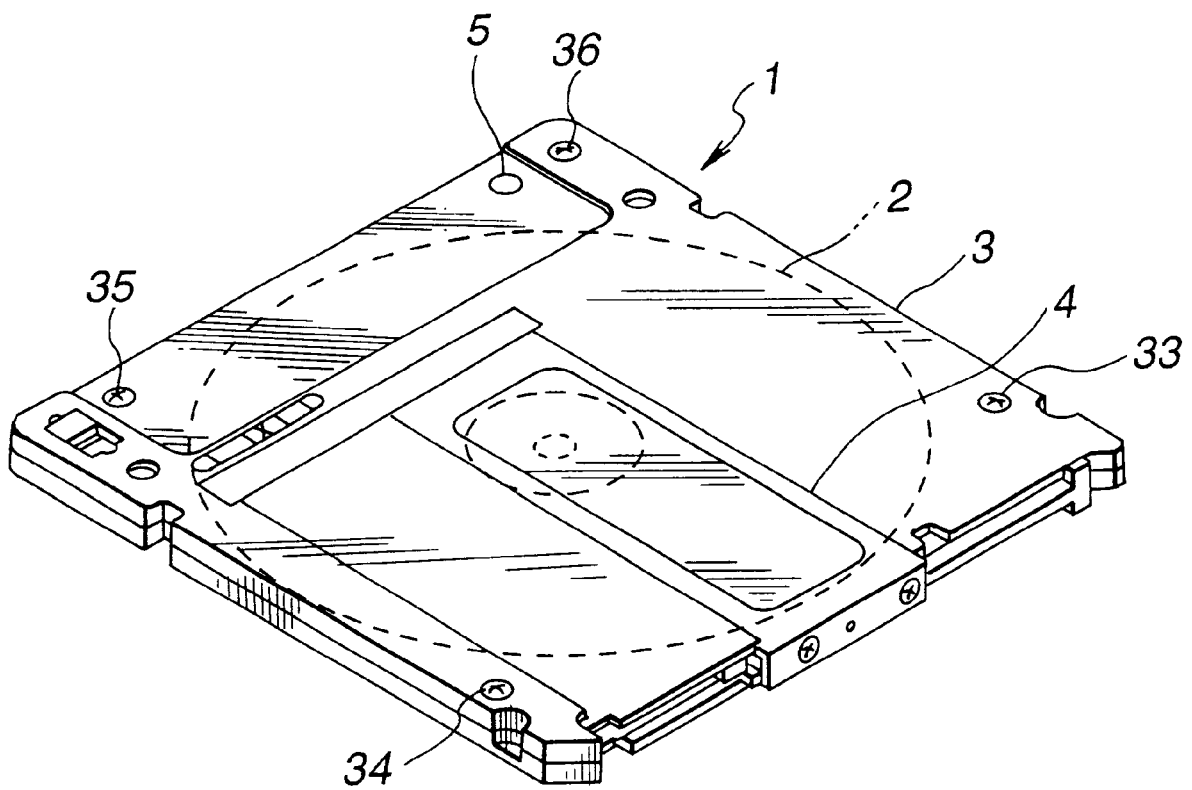
FIG. 2 is a back view of the disc cartridge of FIG. 1 to which the first embodiment is applied.

As is understood from FIGS. 2 and 3, the shutter 4 is slidably disposed to the assembled rectangular case 3. As is seen from FIG. 3, the shutter 4 comprises an upper blind plate 4a which is slidably put on the rectangular recess 31d formed on the upper side of the disc cartridge 1, a lower blind plate 4b which is slidably put on the rectangular recess 32d formed on the lower side of the assembled rectangular case 3 and a bridge plate 4c by which the two blind plates 4a and 4b are united. The upper blind plate 4a has such a size as to sufficiently cover the rectangular cut 31c and the lower blind plate 4b has such a size as to sufficiently cover the rectangular cut 32a. An bar-like slide member 43 is connected through connecting screws 41 and 42 to an inner surface of the bridge plate 4c, so that the slide member 43 and the shutter 4 move or slide as a unit. The slide member 43 has at its axial ends leg portions 43a and 43b which are slidably engaged with the above-mentioned slide guide grooves 31f and 31g of the assembled rectangular case 3. Thus, the shutter 4 slides on the rectangular case 3 in a direction parallel with the front edge of the case 3. Due to sliding of this shutter 4, the two cuts 31c and 32a of the case 3 are synchronously closed and synchronously opened by the blind plates 4a and 4b respectively. The lower blind plate 4b has an inward leading end which is slidably received in a guide slot defined by an elongate guide plate 44 fixed to the lower half 32. Due to provision of the guide plate 44, the leading end of the lower blind plate 4b is suppressed from being lifted out of the outer surface of the lower half 32.

The shutter 4 is biased by a return spring 45 in a given direction, that is, a direction of the arrow "C" in FIG. 3, to close the two cuts 31c and 32a with the blind plates 4a and 4b. Thus, when the shutter 4 is moved in the other direction against the return spring 45, the two cuts 31c and 32a become opened exposing upper and lower surfaces of the recording disc 2 therethrough. That is, the shutter 4 is movable between a close position wherein the two cuts 31c and 32a are closed and an open position wherein the two cuts 31c and 32a are opened.

As shown in FIG. 3, the discriminating metal piece 5 is positioned at one end of the elongate recess 32e of the lower half 32 near the connecting screw 36. The discriminating metal piece 5 is circular in shape and is constructed of a stainless steel or the like.

Figure 4:
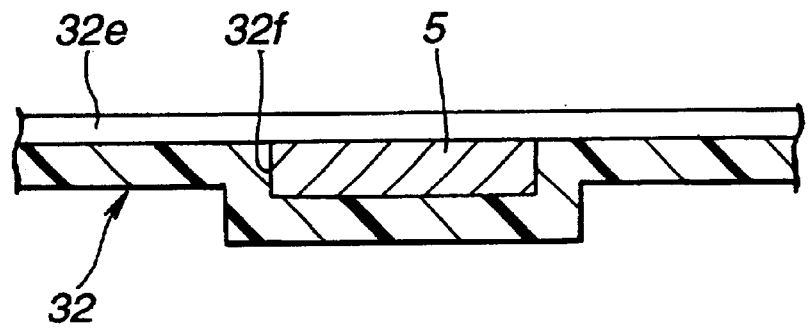
FIG. 4 is an enlarged sectional view taken along the line IV—IV of FIG. 3.
Figure 5:
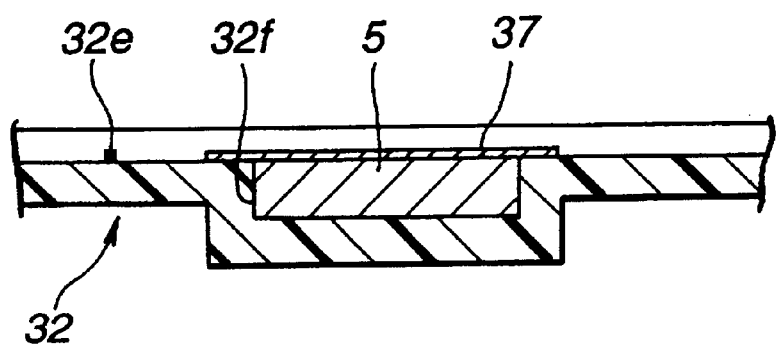
FIGS. 5 and 6 are views similar to FIG. 4, but showing modifications of the first embodiment respectively.
Figure 6:
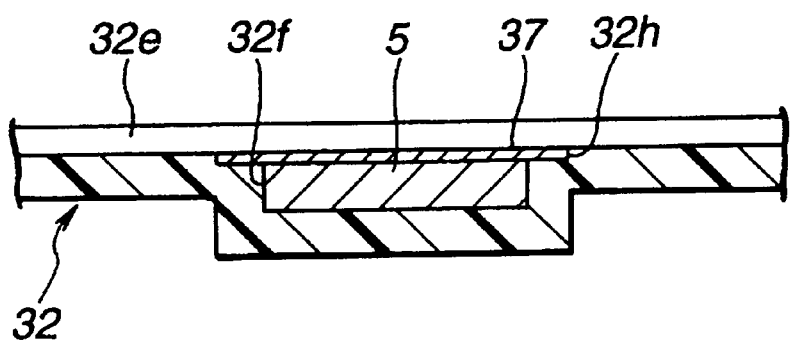

As is seen from FIG. 4, the discriminating metal piece 5 is tightly received in a circular recess 32f formed in the bottom of the elongate recess 32e of the lower half 32 of the case 3. If desired, as is seen from FIG. 5, an exposed upper surface of the metal piece 5 may be covered with a protection sheet 37, and as is seen from FIG. 6, the protection sheet 37 may be received in a recess 32h so that an upper surface of the protection sheet 37 is flush with the bottom surface of the elongate recess 32e of the lower half 32. With provision of the protection sheet 37, disconnection of the discriminating metal piece 5 from the recess 32f is assuredly prevented. Furthermore, if desired, the discriminating metal piece 5 may be a sheet piece. In this case, the metal piece 5 can be connected to the elongate recess 32e by means of an adhesive double coated tape or the like.

Figure 7:
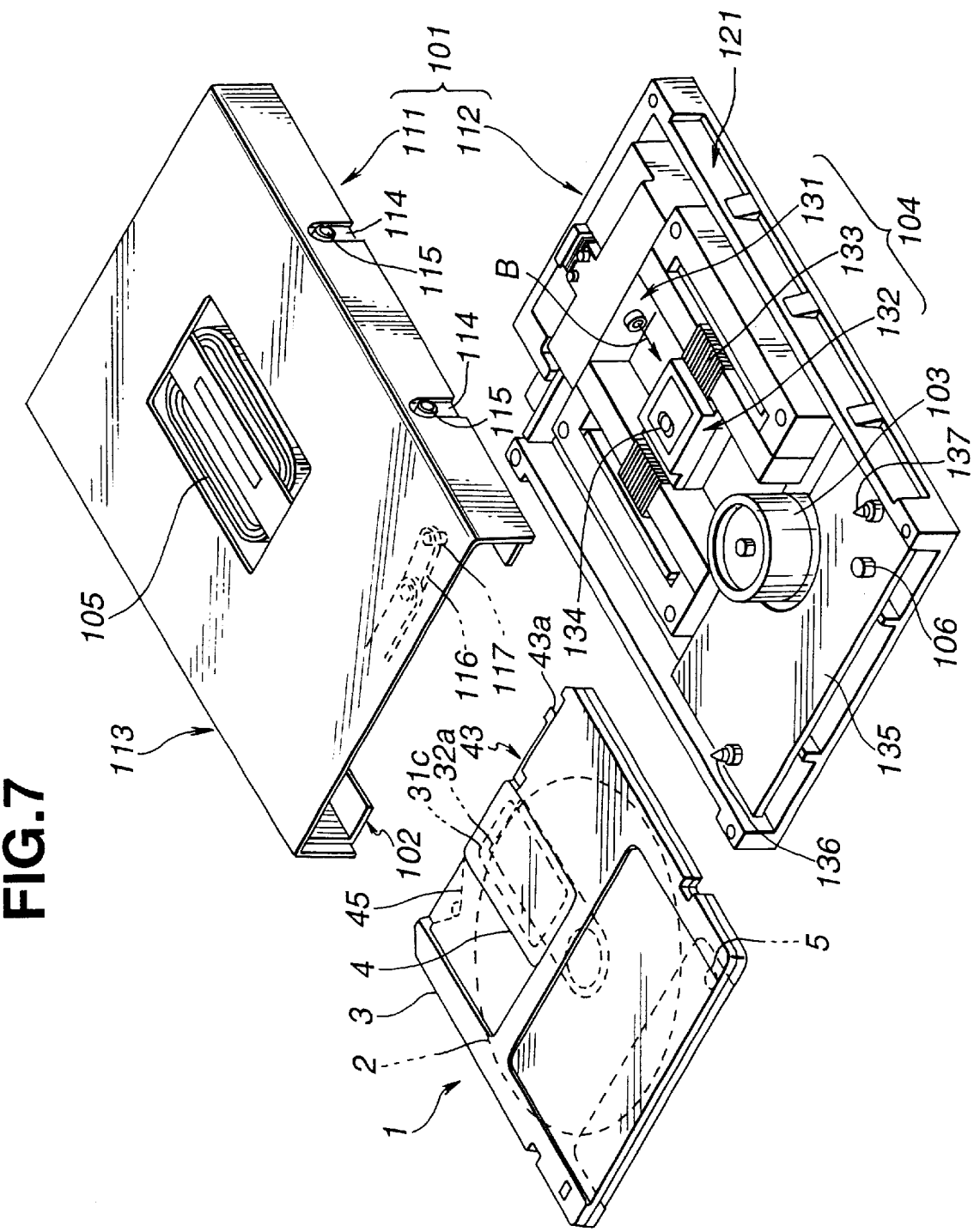
FIG. 7 is an exploded view of the drive device of FIG. 1 to which the first embodiment is applied.

Detailed construction of the drive device 101 will be described with reference to FIG. 7 which shows an exploded view of the drive device 101. For ease of understanding, the assembled disc cartridge 1 is also shown in the drawing.

The drive device 101 generally comprises a loading assembly 111 and a base assembly 112 which supports thereon the loading assembly 111.

The loading assembly 111 comprises the above-mentioned cartridge holder 102 and a frame 113 in which the cartridge holder 102 is vertically movable. For this vertical movement, the cartridge holder 102 has at its side walls two pairs of guide pins 115 which are accommodated in vertically extending openings 114 formed in side walls of the frame 113. Although not shown in the drawing, a holder operating plate having a sloped surface is incorporated with the guide pins 115, so that sliding of the holder operating plate in fore-and-aft directions induces upward and downward movement of the cartridge holder 102 relative to the frame 13.

The cartridge holder 102 is equipped with a shutter opening arm 116 which is pivotally connected to a front portion of the cartridge holder 102 from which the disc cartridge 1 is inserted. A pin 117 is fixed to a leading end of the arm 116. The above-mentioned bias coil 105 is connected to a middle portion of the cartridge holder 102.

When the disc cartridge 1 is slid into the cartridge holder 102, the pin 117 of the shutter opening arm 116 pushes the lead portion 43a of the slide member 43 to move, against the force of the return spring 45, the shutter 4 to the open position wherein the two cuts 31c and 32a of the disc cartridge 1 are opened. When thereafter the disc cartridge 1 is brought to a proper position in the cartridge holder 102, the above-mentioned operating plate is actuated to put down the cartridge holder 102 onto the base assembly 112. Upon this, the hub 22 of the optical/magnetic disc 2 is caught or chucked by the spindle 103 of the base assembly 112. Thereafter, the spindle 103 is rotated to rotate the disc 2 in such a manner as will be described hereinafter.

The base assembly 111 comprises a chassis 121 to which the spindle 103 and the recording/reading head unit (viz., pick-up) 104 are mounted.

The recording/reading head unit 104 generally comprises an optical fixed part 131, an optical movable part 132 and a voice coil motor (VCM) 133. The voice coil motor 133 is positioned below the optical/magnetic disc 2 and functions to move the optical movable part 132 in a radial direction of the disc 2. Although not shown in the drawing, a laser diode is possessed by the optical fixed part 131. An objective lens 134 is held by the optical movable part 132, which faces upward. A half-mirror is installed in the movable part 132 just below the objective lens 134.

To read information recorded on the recording surface of the optical/magnetic disc 2, a laser beam "B" from the laser diode of the optical fixed part 131 is led into the optical movable part 132, reflected by the half-mirror and emitted from the objective lens 134 to the information recording surface of the disc 2 to read the information on the recording surface. The laser beam thus including the information is led back through the same path to an information reading section possessed by the optical fixed part 131.

To record information onto the recording surface of the optical/magnetic disc 2, a powered laser beam is produced by the laser diode, which is irradiated from the objective lens 134 to the recording surface of the disc 2 to heat the same at the Curie point to remove magnetism therefrom. During this, the bias coil 105 is kept energized to apply a bias magnetic field to the recording surface to provide the same with a so-called "S-N" configuration for recording the information.

To the chassis 121, there is mounted a base plate 135 which has a rounded recess for accommodating the spindle 103. The base plate 135 has first and second disc cartridge positioning pins 136 and 137 fixed thereto.

The base plate 135 has near the positioning pin 137 the metal sensor 106 mounted thereto. As will be described hereinafter, the metal sensor 106 senses the identification metal piece 5 attached to the disc cartridge 1.

Figure 8:
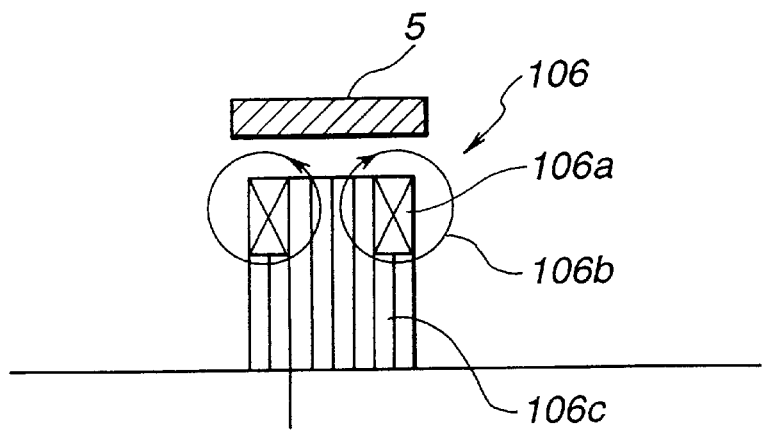
FIG. 8 is a schematic illustration of a disc type discriminating apparatus which constitutes an essential portion of the present invention.

As is seen from FIG. 8, the metal sensor 106 comprises generally a detecting coil 106a and a high-frequency oscillating circuit 106c which allows the detecting coil 106a to produce a high-frequency magnetic field 106b. When, with the detecting coil 106 producing the high-frequency magnetic field 106b, the identification metal piece 5 is brought to the area of the magnetic field 106b, induced current is forced to flow through the metal piece 5 to change the impedance of the detecting coil 106a and thus the oscillation is forced to stop. Thus, by sensing the stop of the oscillation, discrimination is so made by the controller that the disc cartridge 1 is of a type carrying the identification metal piece 5.

The disc cartridge 1 and the drive device 101, to which the first embodiment is practically applied, have the above-mentioned constructions.

Figure 9:
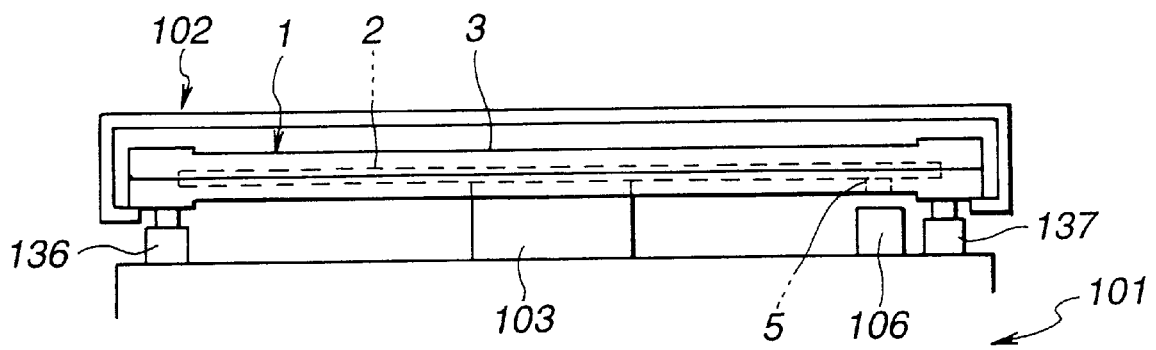
FIG. 9 is a sectional view of the drive device of FIG. 1 under a condition wherein the drive device has set therein the disc cartridge of FIG. 1 to which the first embodiment is applied.

Accordingly, when, in operation, the disc cartridge 1 is slid into the cartridge holder 102 of the drive device 101, the shutter 4 of the disc cartridge 1 is opened by the shutter opening arm 116 of the cartridge holder 102, and then, as is shown in FIG. 9, the disc cartridge 1 is lowered down together with the cartridge holder 102 to a properly set position wherein the optical/magnetic disc 2 is caught or chucked by the spindle 103 and the identification metal piece 5 of the disc cartridge 1 faces the metal sensor 106 of the drive device 101. Upon this, the metal sensor 106 senses the identification metal piece 5 in the above-mentioned manner and determines that the disc cartridge 1 is of a type carrying the identification metal piece 5, that is, for example, a high density type.

Figure 10:
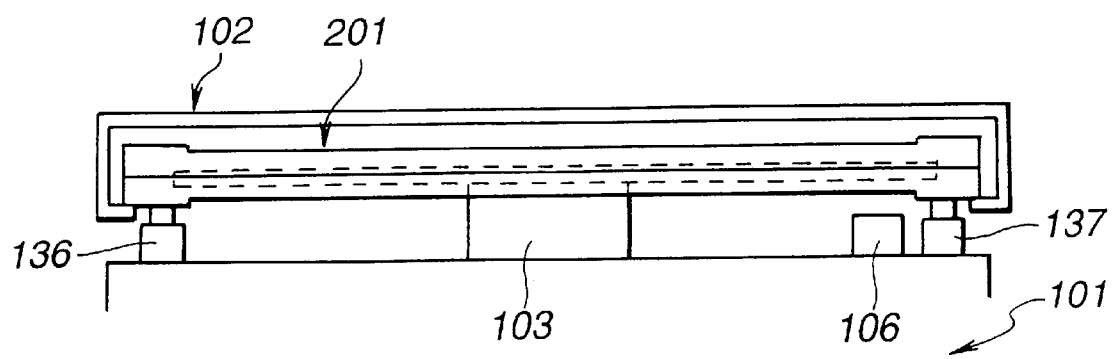
FIG. 10 is a view similar to FIG. 9, but showing a condition wherein the drive device of FIG. 1 has set therein the conventional disc cartridge.

While, as is seen from FIG. 10, when a conventional disc cartridge 201 (viz., low density type) having no identification metal piece 5 is put into the drive device 101 in the above-mentioned manner, the metal sensor 106 fails to sense the metal piece 5 and thus the impedance of the detecting coil 106 does not change. Thus, discrimination is so made by the controller that the disc cartridge just set in the drive device 101 is of a type carrying no identification metal piece 5, that is, the conventional low density type.

Figure 11:
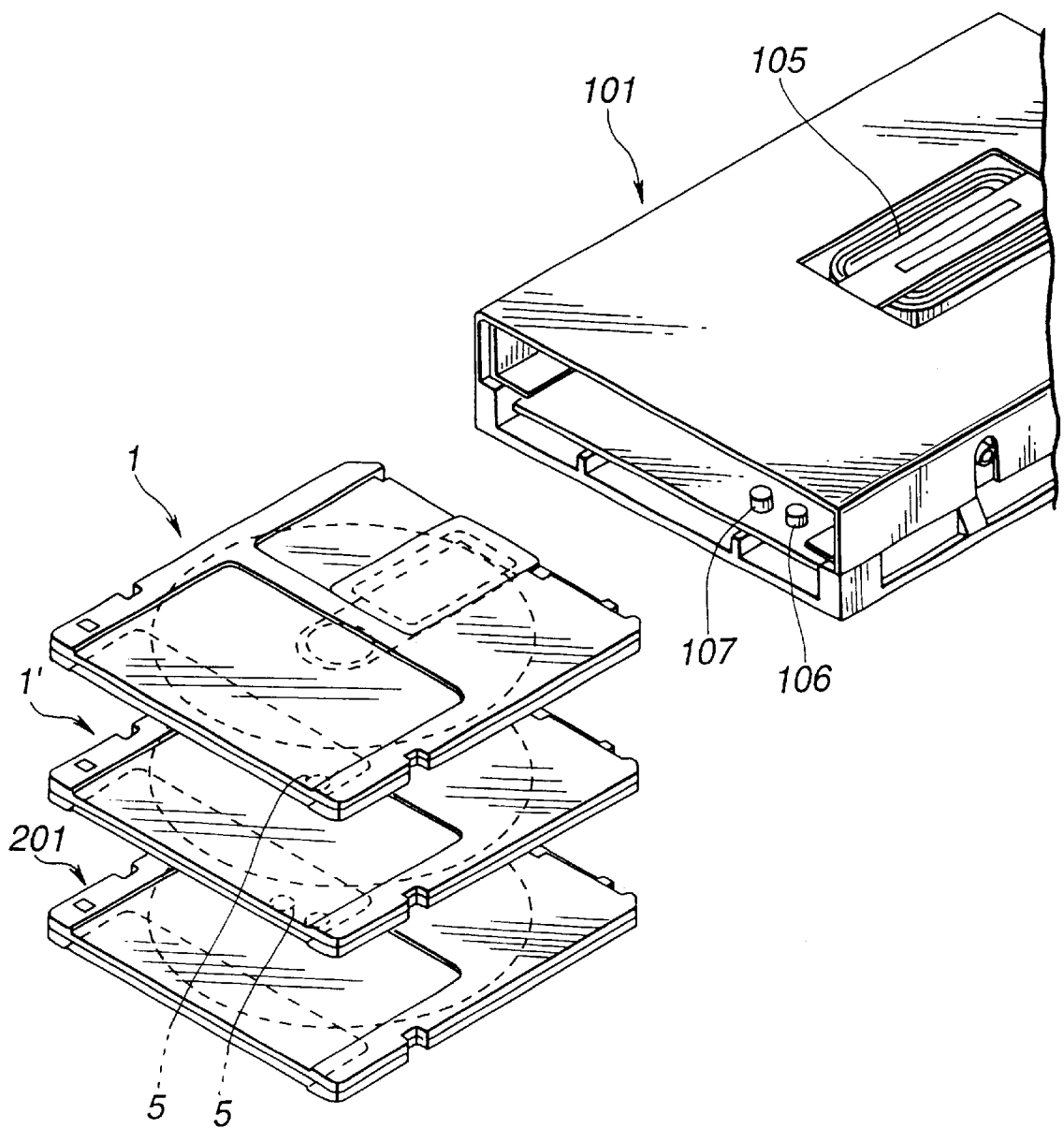
FIG. 11 is a perspective view showing two disc cartridges and a drive device, to which a second embodiment of the present invention is practically applied, and showing one conventional disc cartridge.

Referring to FIGS. 11, 12A, 12B and 12C, particularly FIG. 11, there is shown a second embodiment of the present invention. In this second embodiment, two, that is, first and second metal sensors 106 and 107 are mounted to separate portions of the drive device 101. In this case, three types of disc cartridges can be discriminated.

In FIG. 11, three types of disc cartridges 1, 1' and 201 are shown. The upper disc cartridge 1 is of the above-mentioned high density type, the middle disc cartridge 1' is of a medium density type and the lower disc cartridge 201 is of the above-mentioned low density type (or conventional type). As shown, the high density type disc cartridge 1 is equipped with an identification metal piece 5 of stainless steel at a position that, when the disc cartridge 1 is put into the drive device 101, faces the first metal sensor 106, the medium density type disc cartridge 1' is equipped with an identification metal piece 5 of stainless steel at a position that, when the disc cartridge 1' is put into the drive device 101, faces the second metal sensor 107, and the low density type disc cartridge 201 is not equipped with the identification metal piece 5.

Figure 12A:
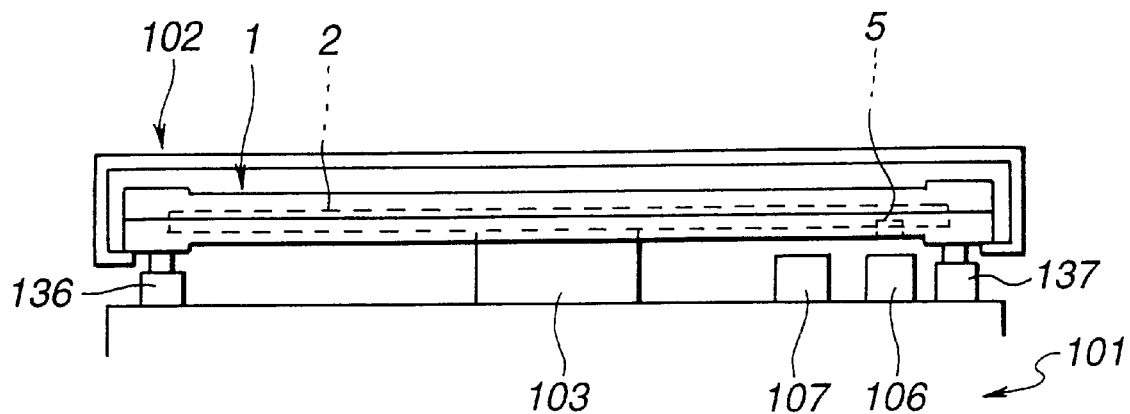
FIGS. 12A, 12B and 12C are sectional views of the drive device of FIG. 11 with first type (viz., high density type), second type (viz., medium density type) and third type (viz., low density type) disc cartridges set therein respectively.
Figure 12B:
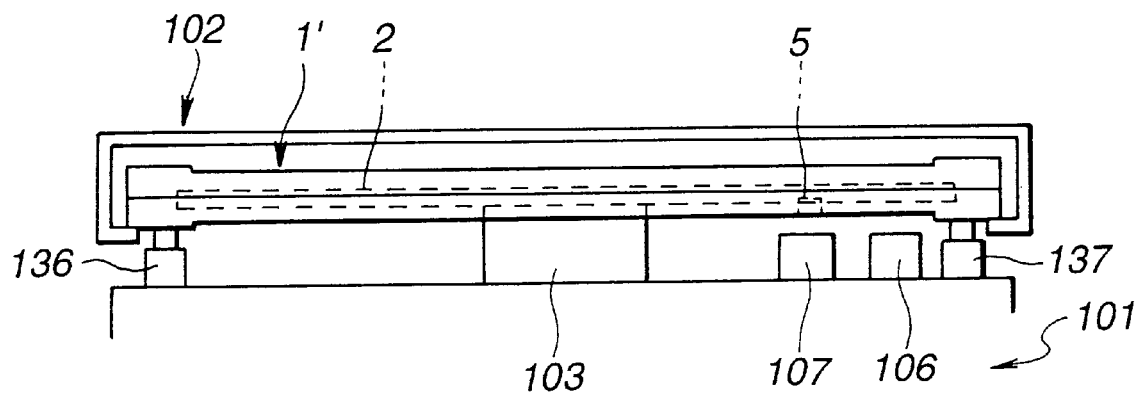
Figure 12C:
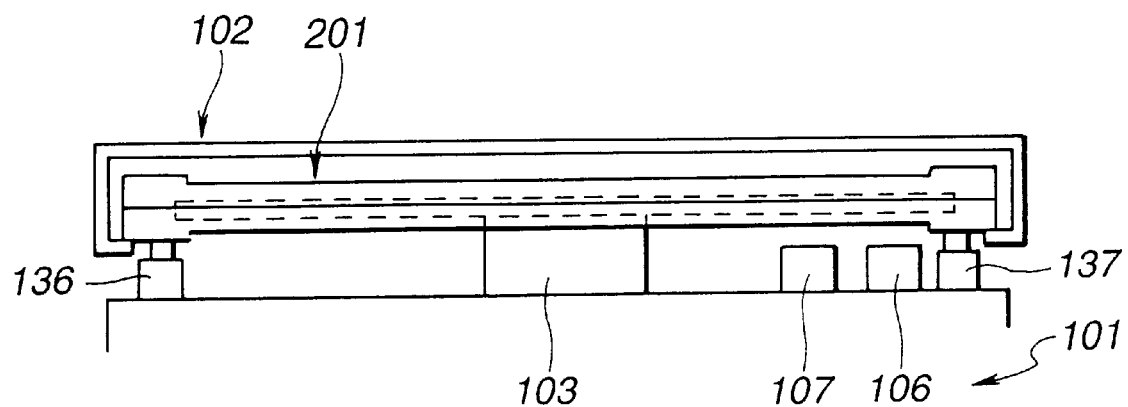

Accordingly, as is seen from FIG. 12A, when the high density type disc cartridge 1 is put into the drive device 101, the first metal sensor 106 senses the stainless steel metal piece 5 and thus discrimination is so made by the controller that the disc cartridge 1 just set in the drive device 101 is of the high density type. As is seen from FIG. 12B, when the medium density type disc cartridge 1' is put into the drive device 101, the second metal sensor 107 senses the stainless steel metal piece 5 and thus discrimination is so made that the disc cartridge 1' just set in the drive device 101 is of the medium density type, and as is seen from FIG. 12C, when the lower density type disc cartridge 201 is put into the drive device 101, either of the first and second metal sensors 106 and 107 fails to sense the metal piece 5 and thus discrimination is so made that the disc cartridge 201 just set in the drive device 101 is of the low density type.

Figure 13:
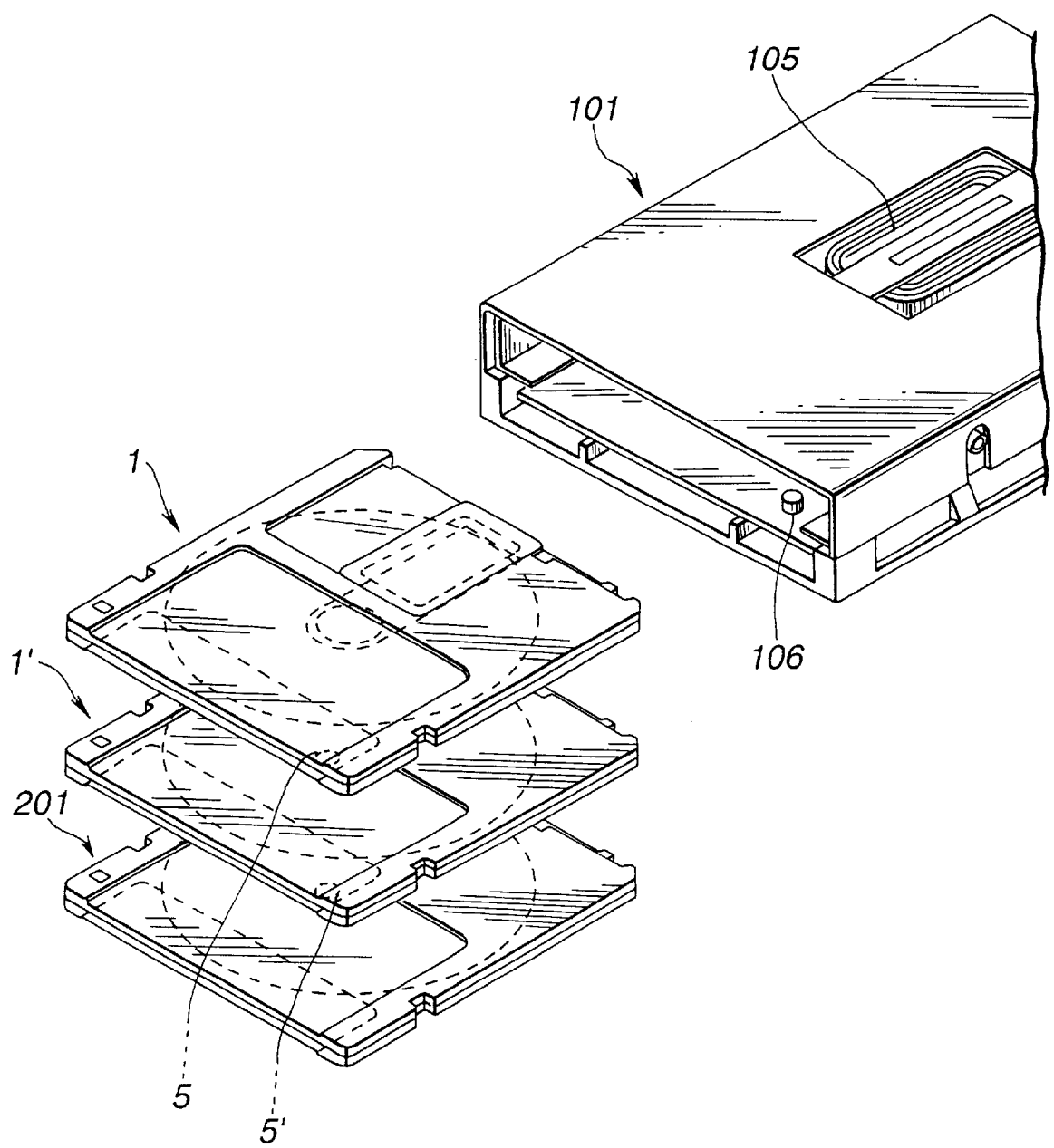
FIG. 13 is a perspective view showing two disc cartridges and a drive device, to which a third embodiment of the present invention is practically applied, and showing one conventional disc cartridge.

Referring to FIGS. 13, 14A, 14B and 14C, particularly FIG. 13, there is shown a third embodiment of the present invention. In this third embodiment, three types of disc cartridges are discriminated by only one metal sensor 106 mounted to the drive device 101.

In FIG. 13, three types of disc cartridges 1, 1' and 201 are shown. The upper disc cartridge 1 is of the above-mentioned high density type, the middle disc cartridge 1' is of a medium density type and the lower disc cartridge 201 is of the above-mentioned low density type. The high density type disc cartridge 1 is equipped with an identification metal piece 5 of stainless steel at a position that, when the disc cartridge 1 is put into the drive device 101, faces the metal sensor 106, the medium density type disc cartridge 1' is equipped with an identification metal piece 5' of aluminum at a position that, when the disc cartridge 1' is put into the drive device 101, faces the metal sensor 106, and the low density type disc cartridge 201 is not equipped with an identification metal piece 5.

Figure 14A:
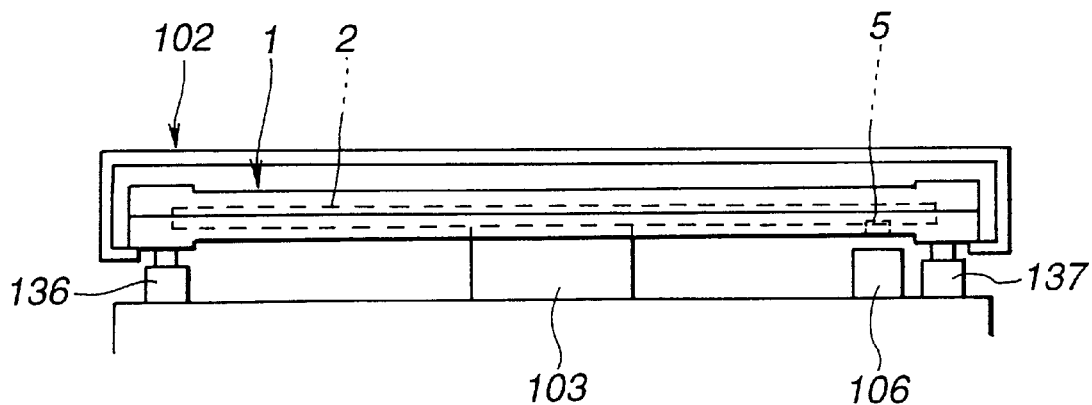
FIGS. 14A, 14B and 14C are sectional views of the drive device of FIG. 13 with first type (viz., high density type), second type (viz., medium density type) and third type (viz., low density type) disc cartridges set therein respectively.
Figure 14B:
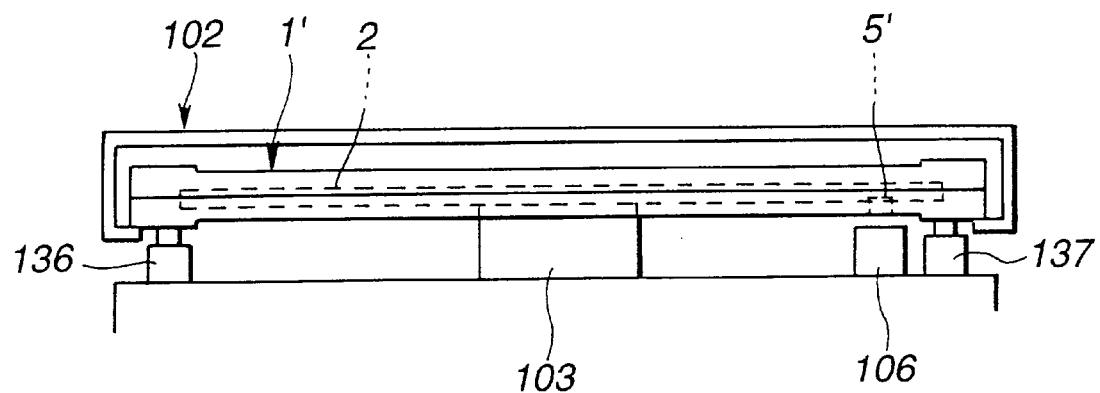

Accordingly, as is seen from FIG. 14A, when the high density type disc cartridge 1 is put into the drive device 101, the metal sensor 106 senses the stainless steel metal piece 5 and thus discrimination is so made by the controller that the disc cartridge 1 just set in the drive device 101 is of the high density type. As is seen from FIG. 14B, when the medium density type disc cartridge 1' is put into the drive device 101, the metal sensor 106 senses the aluminum metal piece 5' and thus discrimination is so made that the disc cartridge 1' just set in the drive device 101 is of the medium density type.

It is now to be noted that due to essential difference in property between aluminum and stainless steel by which the metal pieces 5 are produced, a frequency produced by the high-frequency oscillating circuit 106c of the metal sensor 106 when sensing the aluminum metal piece 5' is different from that produced when sensing the stainless steel metal piece 5. Thus, by processing this frequency difference, discrimination as to whether the disc cartridge is of the high density type or the medium density type is carried out by the controller.

Figure 14C:
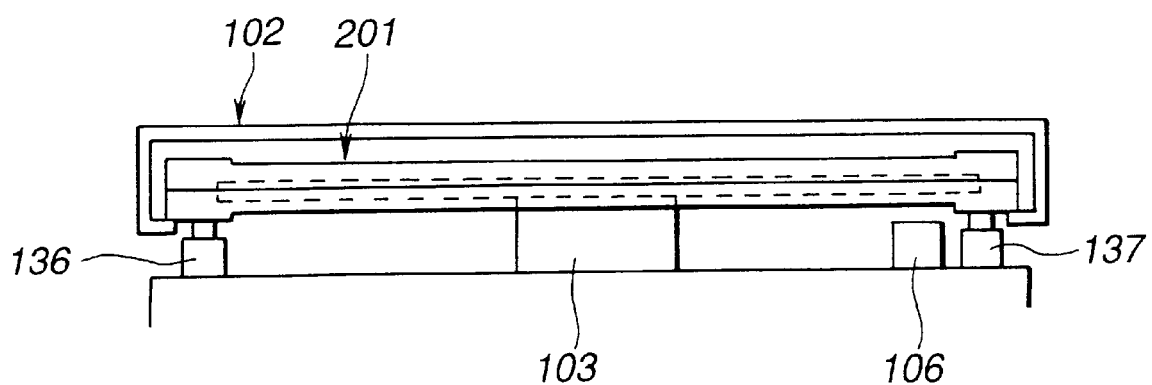

As is seen from FIG. 14C, when the low density type disc cartridge 201 is put into the drive device 101, the metal sensor 106 fails to sense the metal piece 5 and thus discrimination is so made that the disc cartridge 201 just set in the drive device 101 is of the low density type.

It is to be noted that in addition to the above-mentioned stainless steel and aluminum, other metals such as copper, brass and the like are usable as the material of the identification metal pieces 5 and 5'.

Figure 15:
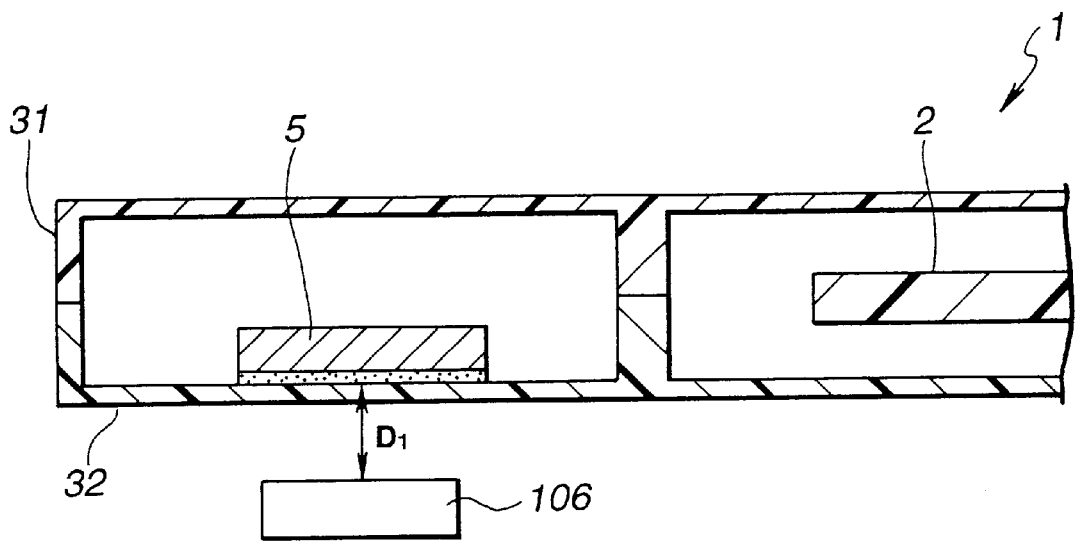
FIG. 15 is a partial sectional view of a disc cartridge, showing an identification metal piece fixed to a lower half of the disc cartridge.
Figure 16:
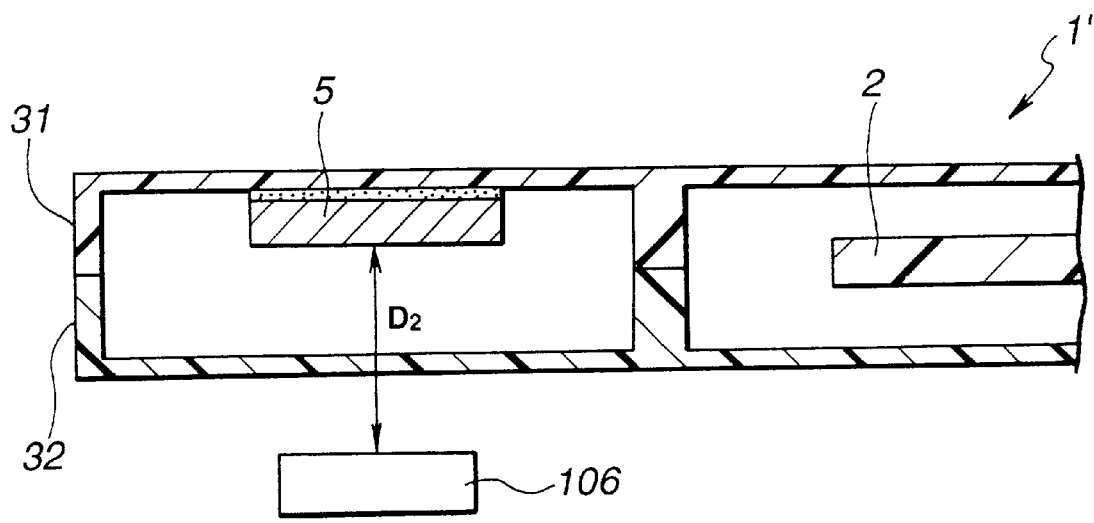
FIG. 16 is a view similar to FIG. 15, but showing the identification metal piece fixed to an upper half of the disc cartridge.

If desired, a measure depicted by FIGS. 15 and 16 may be employed for discriminating a disc cartridge set in the drive device 101. That is, in the high density type disc cartridge 1 shown in FIG. 15, the identification metal piece 5 is fixed to the lower half 32 of the disc cartridge 1, while, in the medium density type disc cartridge 1' shown in FIG. 16, the identification metal piece 5 is fixed to the upper half 31 of the disc cartridge 1'. Thus, when the high density type disc cartridge 1 (see FIG. 15) is put into the drive device 101, the identification metal piece 5 faces the metal sensor 106 keeping a shorter distance of "D1" therebetween. While, in case of the medium density type disc cartridge 1' (see FIG. 16), the identification metal piece 5 faces the metal sensor 106 keeping a longer distance of "D2" therebetween. Due to difference of the distance, frequencies produced by the high-frequency oscillating circuit 106c of the metal sensor 106 when sensing the metal pieces 5 and 5 are different. Thus, by processing this frequency difference, discrimination as to whether the disc cartridge is of the high density type 1 or the medium density type 1' is carried out by the controller.

Figure 17:
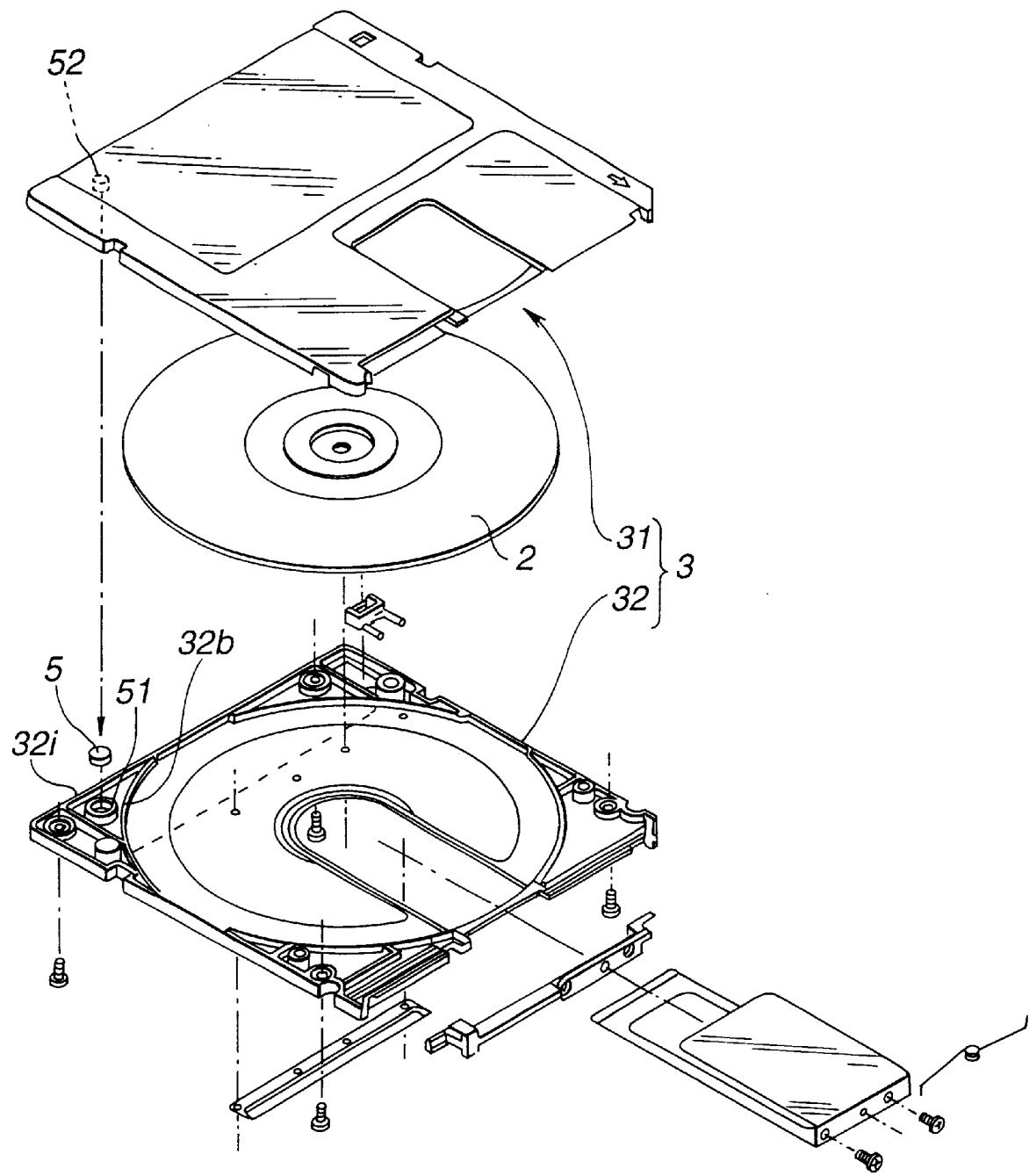
FIG. 17 is an exploded view of the disc cartridge with the identification metal piece fixed to a different position of the disc cartridge.
Figure 18:
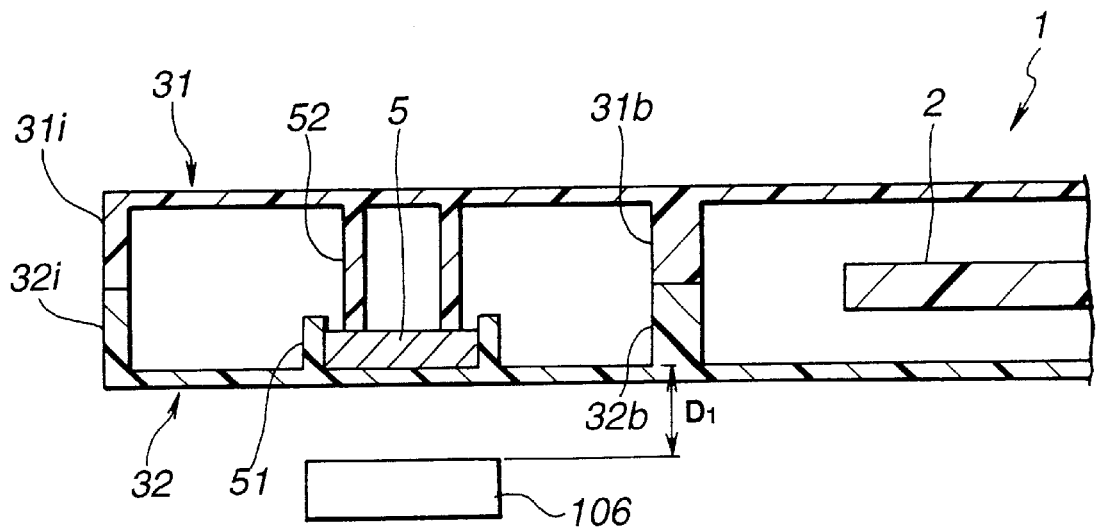
FIG. 18 is a view similar to FIG. 15, but showing the identification metal piece fixed to another different position of the disc cartridge.
Figure 19:
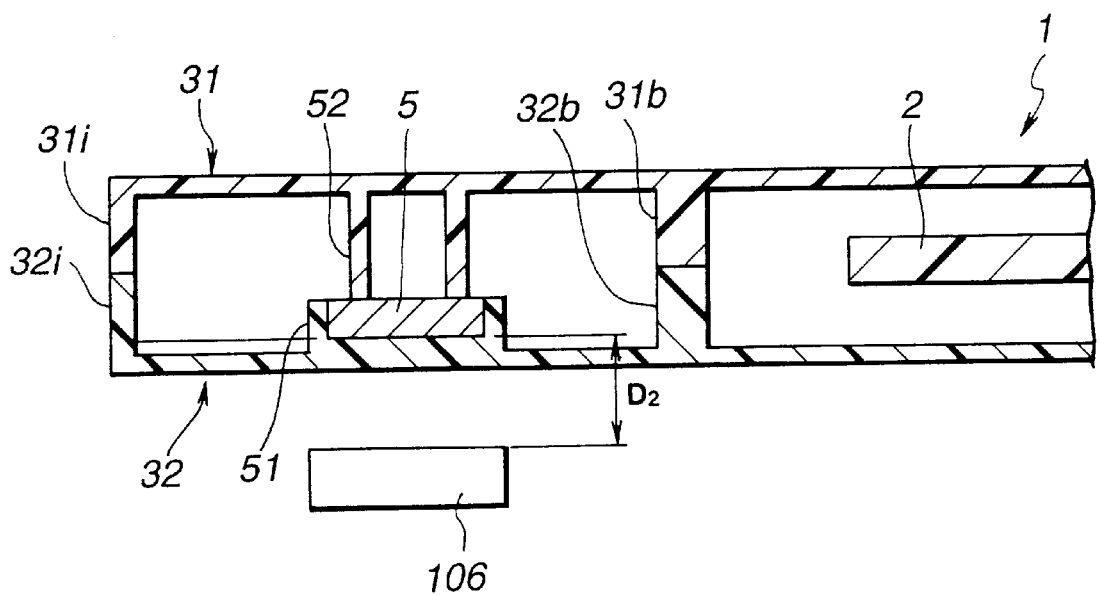
FIG. 19 is a view similar to FIG. 15, but showing the identification metal piece fixed to still another different position of the disc cartridge.

Furthermore, if desired, a measure depicted by FIGS. 17, 18 and 19 may be employed for discriminating a disc cartridge set in the drive device 101. That is, in this measure, the depth of a recess for putting therein the identification metal piece 5 changes for each type of the disc cartridges. As is seen from FIG. 17, a cylindrical hollow boss 51 is formed on the inner surface of the lower half 32 of the rectangular case 3 at a position between the larger annular ridge 32b and an outermost peripheral wall 32i. The identification metal piece 5 is put into the boss 51. Another cylindrical hollow boss 52 is formed on the inner surface of the upper half 31, which, when the two halves 31 and 32 are coupled to constitute the case 3, abuts against a top of the metal piece 5 put in the hollow boss 51.

The detail of this measure is depicted by FIGS. 18 and 19. In the high density type disc cartridge 1 shown in FIG. 18, the depth of the hollow boss 51 for the metal piece 5 is relatively large, while, in the medium density type disc cartridge 1' shown in FIG. 19, the depth of the hollow boss 51 is relatively small. Thus, when the high density type disc cartridge 1 (see FIG. 18) is put into the drive device 101, the identification metal piece 5 faces the metal sensor 106 keeping a shorter distance of "D1" therebetween. While, in case of the medium density type disc cartridge 1' (see FIG. 19), the identification metal piece 5 faces the metal sensor 106 keeping a longer distance of "D2" therebetween. For the reason as mentioned hereinabove, discrimination as to whether the disc cartridge is of the high density type 1 or the medium density type 1' is carried out by the controller.

Figure 20:
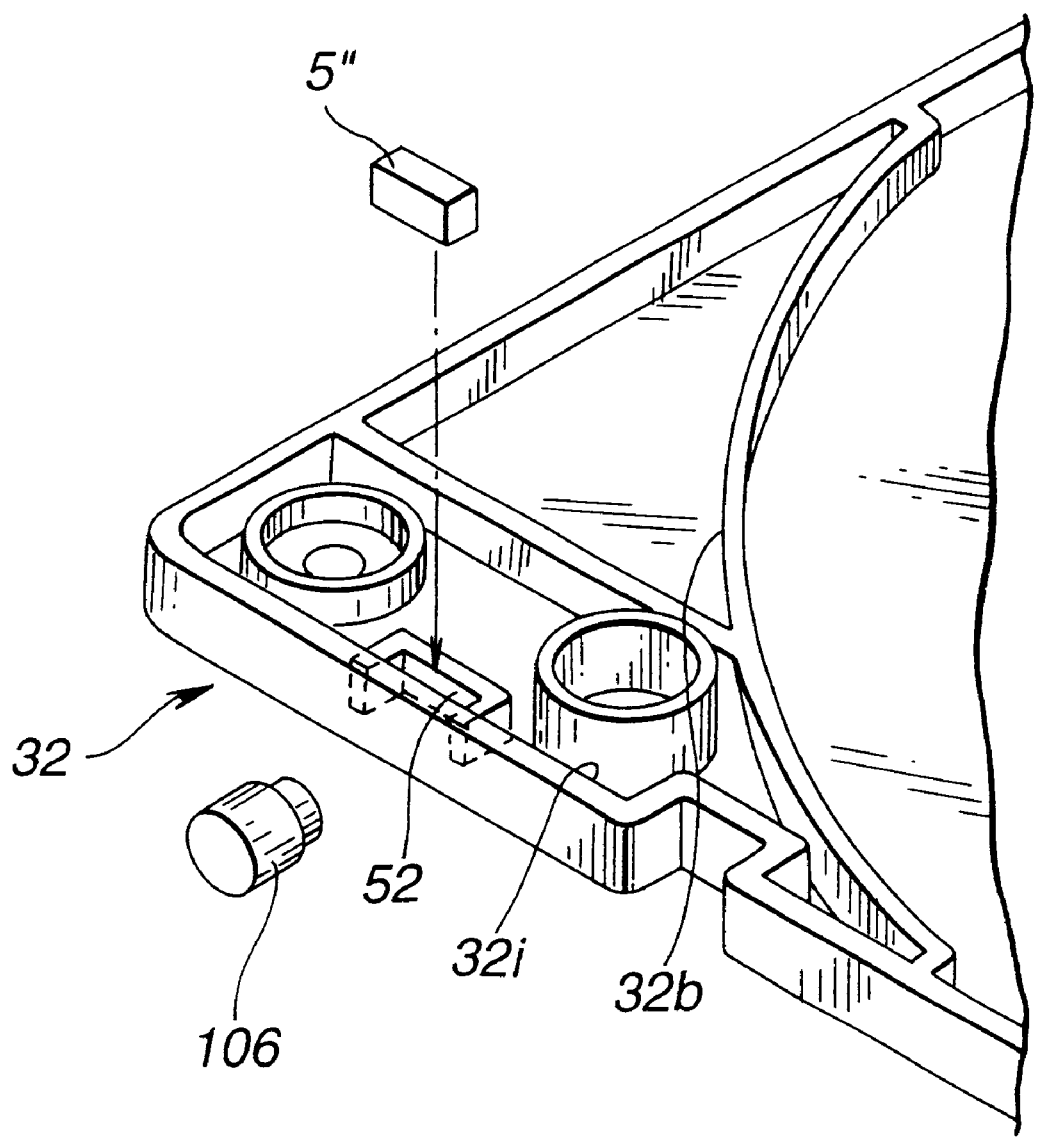
FIG. 20 is a partial perspective view of a lower half of the disc cartridge with the identification metal piece fixed to a further different position of the disc cartridge.

Furthermore, if desired, a measure depicted by FIG. 20 may be employed for discriminating a disc cartridge set in the drive device 101. That is, in this measure, a mounting member 52 is integrally provided to the outermost peripheral wall 32i of the lower half 32 of the case 3. A rectangular parallelepiped identification metal piece 5" is held by the mounting member 52. The material of the metal piece 5' changes for each type of the disc cartridges. As shown, the metal sensor 106 mounted in the drive device 101 is oriented to face in a direction parallel with a major surface of the lower half 32.

Furthermore, if desired, one of the four connecting screws 33, 34, 35 and 36 (see FIG. 3) for connecting the upper and lower halves 31 and 32 may be used as the identification metal piece 5. For example, in the high density type disc cartridge 1, the connecting screw 36 is constructed of aluminum, and the other three connecting screws 33, 34 and 35 are constructed of iron coated with zinc. The metal sensor 106 in the drive device 101 is placed at a position that, when the disc cartridge is put into the drive device 101, faces the connecting screw 36. Thus, when the disc cartridge 1 having the above-mentioned connecting screws is put into the drive device 101, the metal sensor 106 senses the connecting screw 36 (viz., identification metal piece) and discrimination is so made that the disc cartridge 1 just set in the drive device 101 is of the high density type. Furthermore, if desired, the four connecting screws 33, 34, 35 and 36 may be used as the identification metal pieces 5. That is, these four connecting screws are constructed of different metals and four metal sensors are mounted to the drive device 101 for sensing the four metal pieces 33, 34, 35 and 36. In this case, numerous types of disc cartridges can be discriminated.

Figure 21:
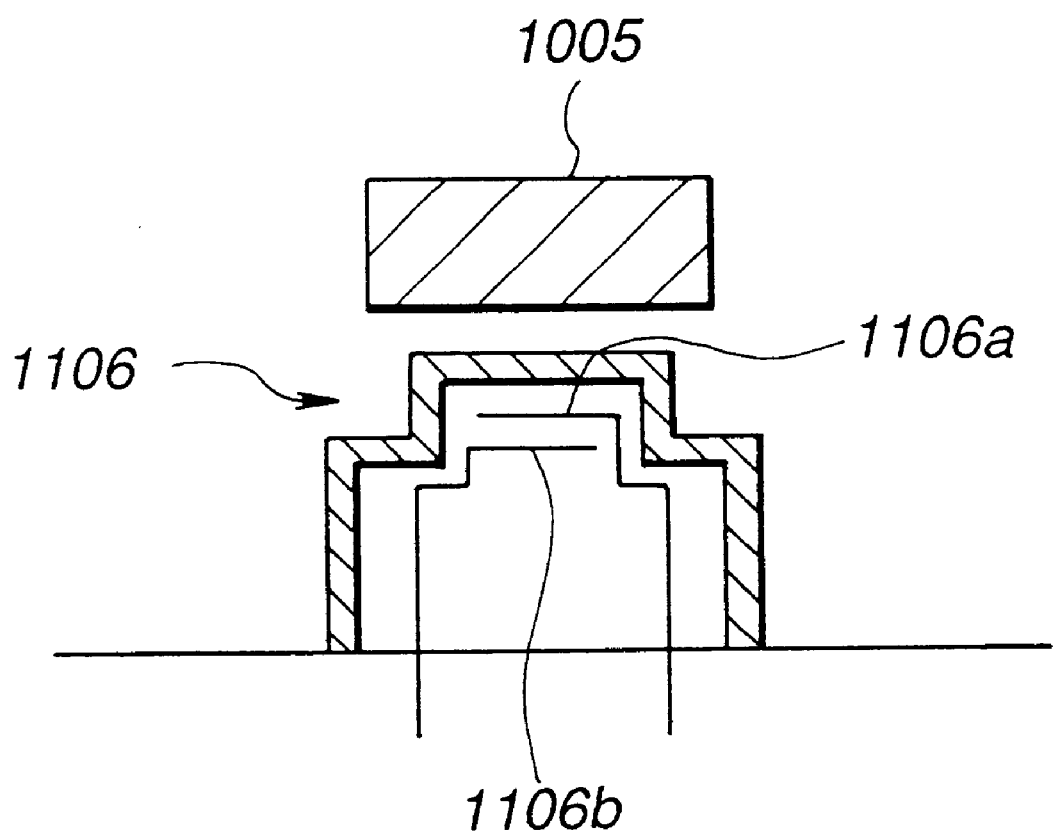
FIG. 21 is a schematic illustration of another disc type discriminating apparatus which is replaceable with the disc type discriminating apparatus of FIG. 8.

Furthermore, if desired, in place of the above-mentioned disc type discriminating apparatus of FIG. 8 which includes the identification metal piece 5 and the metal sensor 106, another type disc type discriminating apparatus may be used, which is shown in FIG. 21.

The disc type discriminating apparatus of FIG. 21 comprises a magnetic sensor 1106 which is mounted in the drive device 101 and an identification magnet piece 1005 which is fixed to the disc cartridge. The magnetic sensor 1106 comprises a fixed contact 1106a and a movable contact 1106b which are housed in a case (no numeral). When the identification magnet piece 1005 is brought to a position near the magnetic sensor 1106, the movable contact 1106b is brought into contact with the fixed contact 1106a to turn the sensor 1106 ON.

Thus, when the disc type discriminating apparatus of FIG. 21 is practically employed in the above-mentioned first embodiment of FIG. 1 in place of the discriminating apparatus of FIG. 8, such changes are needed that the identification magnet piece 1005 is fixed to the disc cartridge 1 in place of the identification metal piece 5 and the magnetic sensor 1106 is connected to the drive device 101 in place of the metal sensor 106.

Thus, when the disc cartridge 1 carrying the identification magnet piece 1005 is sled into the drive device 101, the magnetic sensor 1106 of the drive device 101 senses the magnet piece 1005 and determines that the disc cartridge 1 is of a type carrying the identification magnet piece 1005, that is, for example, a high density type.

When the disc type discriminating apparatus of FIG. 21 is practically employed in the above-mentioned second embodiment of FIG. 11 in place of the discriminating apparatus of FIG. 8, the following changes are needed.

That is, respective identification magnet pieces 1005 are fixed to the disc cartridges 1 and 1' in place of the identification metal pieces 5 and 5. And, first and second magnetic sensors 1106 are mounted to the drive device 101 in place of the two metal sensors 106 and 107.

Thus, when the high density type disc cartridge 1 carrying the identification magnet piece 1005 is put into the drive device 101, the first magnetic sensor 1106 senses the identification magnet piece 1005 and thus discrimination is so made that the disc cartridge 1 just set in the drive device 101 is of the high density type. While, when the medium density type disc cartridge 1' carrying the identification magnet piece 1005 at a different position is put into the drive device 101, the second magnetic sensor 1106 senses the identification magnet piece 1005 and thus discrimination is so made that the disc cartridge 1' just set in the drive device 101 is of the medium density type, and when the low density type disc cartridge 201 having no identification magnet piece carried thereon is put into the drive device 101, either of the first and second magnetic sensors 1106 and 1106 fails to sense the identification magnet piece and thus discrimination is so made that the disc cartridge 201 just set in the drive device 101 is of the low density type.

When the disc type discriminating apparatus of FIG. 21 is practically employed in the above-mentioned third embodiment of FIG. 13 in place of the discriminating apparatus of FIG. 8, the following changes are needed.

That is, the identification magnet piece 1005 is fixed to the disc cartridge 1 in place of the stainless steel identification piece 5, a less-powered identification magnet piece is fixed to the disc cartridge 1' in place of the aluminum identification piece 5', and the magnetic sensor 1106 is mounted to the drive device 101 in place of the metal sensor 106.

Thus, when the high density type disc cartridge 1 carrying the identification magnet piece 1005 is put into the drive device 101, the magnetic sensor 1006 senses the identification magnet piece 1005 and thus discrimination is so made that the disc cartridge 1 just set in the drive device 101 is of the high density type. While, when the medium density type disc cartridge 1' carrying the less-powered identification magnet piece is put into the drive device 101, the magnetic sensor 1006 senses the less-powered identification magnet piece and thus discrimination is so made that the disc cartridge 1' just set in the drive device 101 is of the medium density type. When the low density type disc cartridge 201 having no identification magnet piece is put into the drive device 101, the magnetic sensor 1106 fails to sense the identification magnet piece and thus discrimination is so made that the disc cartridge 201 just jet in the drive device 101 is of the low density type.

When the disc type discriminating apparatus of FIG. 21 is practically employed in the above-mentioned measures of FIGS. 15, 16, 17, 18, 19 and 20 in place of the discriminating apparatus of FIG. 8, the following changes are needed.

That is, respective identification magnet pieces 1005 are fixed to the disc cartridges 1 and 1' in place of the identification metal pieces 5 and 5 (or 5"), and the magnetic sensor 1106 is mounted to the drive device 101 in place of the metal sensor 106. Due to the difference in distance between the identification magnet piece 1005 and the magnetic sensor 1106, the magnetic sensor 1106 senses the difference in magnetic force and thus discriminates the types of the disc cartridges.

What is claimed is:

1. A disc cartridge to be received within a recording/reproducing apparatus comprising:
    a recording disc of a predetermined storage capacity;
    a case in which said recording disc is rotatably held; and
    a single non-magnetized identification metal piece fixed to a stationary portion of said case, said identification metal piece identifying the predetermined storage capacity of said recording disc and is sensed by a single metal sensor of a disk drive when the disc cartridge is inserted thereinto to control the disk drive based on the identified storage capacity of the disk cartridge and wherein said identification metal piece is covered in said case by a protective sheet.

2. A disc cartridge as claimed in claim 1, in which said identification metal piece is fixed to an outer surface of said case.

3. A disc cartridge as claimed in claim 1, in which said identification metal piece is fixed to an inside of said case.

4. A disc cartridge as claimed in claim 1, in which said identification metal piece is received in a cylindrical hollow boss which is integrally formed on an inner surface of said case at a position spaced from a disc receiving portion in which said recording disc is located.

5. A disc cartridge as claimed in claim 1, in which said identification metal piece is fixed to a given portion of said case, said given portion representing the predetermined storage capacity of the recording disc installed in said case.

6. A disc cartridge as claimed in claim 1, in which said identification metal piece is constructed of a given material, said given material representing the predetermined storage capacity of the recording disc installed in said case.

7. A disc cartridge as claimed in claim 1, in which said identification metal piece has an outer surface affixed to a given portion of an inner surface of said case, and in which a distance between an outer surface of the case at said given portion and said outer surface of said identification metal piece represents the predetermined storage capacity of said recording disc installed in said case.

8. A disc cartridge as claimed in claim 1, in which said case is formed of upper and lower case halves connected by a number of connecting screws and said identification metal piece is adjacent one of said number of connecting screws.

* * * * *